United States Patent Office 3,471,533
Patented Oct. 7, 1969

3,471,533
ROLLING OIL RECOVERY PROCESS
Ernest Kovacs, Baltimore, Md., assignor to Palm Oil Recovery, Inc., Baltimore, Md., a corporation of Maryland
No Drawing. Filed July 5, 1966, Ser. No. 562,472
Int. Cl. C11b 13/00, 13/04
U.S. Cl. 260—412.5    7 Claims

ABSTRACT OF THE DISCLOSURE

Treating spent rolling oil sludge at an elevated temperature with mineral acid, in an amount less than that required to react with iron present in the sludge, to obtain a sludge-acid mixture having no tendency to separate on gravity settling into an oil layer and a substantially oil-free aqueous layer; passing the mixture at elevated temperature through a porous body of filter material; and physically separating the effluent from the porous body into an oil portion and an aqueous portion substantially free of oil.

---

This invention relates to the treatment of spent rolling oil sludge separated from the spent rolling oil lubricant-coolant which had been used in the cold rolling of steel strip and the like operations to recover the oil content thereof, especially in a form suitable for reuse.

In the cold rolling of steel strip, the rolls and the strip are cooled and lubricated by sprays of rolling oil; this is a mixture of water and an oil, especially a fatty oil such as palm oil or tallow; mineral oil may be, and usually is present. (In some mills, straight mineral oil, and additives, is used to form the rolling oil.) In some places where lubrication is chiefly wanted, only oil is used. For simple cooling of the strip, "straight" water is used. To improve the emulsion character of the rolling oil (hereinafter to be understood as a mixture of oil, fatty and/or mineral, fresh and/or reused, and water) surfactants are sometimes added. In any case the action of the rolls, results in the formation of a tight emulsion.

The severe working of the steel under the rolls results in the removal of fine iron particles, which are carried away with the withdrawn rolling oil. There is evidence that some iron compounds such as fatty acid-iron reaction products and ferrous silicate are also in the withdrawn rolling oil. The nature of the rolling operation results in this iron and iron compounds (hereinafter called iron contaminants) being very intimately associated with the oil-water emulsion present in the withdrawn rolling oil.

The spent rolling oil, spent straight oil and straight water used in the strip mill normally are collected in a common sump(s) or basin(s) where three layers form: (1) a bottom layer of more or less solid oil-water emulsion, generally called sedimentary or bottom sludge, (2) a middle aqueous layer containing some oil—this is often reused in the preparation of rolling oil, and (3) an upper layer of an emulsion of oil, water and iron contaminants, mainly suspended therein, known as supernatant sludge.

In some mills the spent rolling oil, water and other waste mill lubricants are caught as a total effluent. The "oil" is separated from the water and this "oil" is sent to the spent rolling oil recovery operation. In a particular system, the total effluent is separated by air flotation separation into a scum upper layer which is skimmed off the surface of the lower water layer. In this system, only a very small amount of bottom sludge is formed.) This scum contains virtually all of the oil present in the total mill effluent and also practically all the metallic iron present in the total mill effluent.

Hereinafter the term "spent rolling oil sludge" includes: scum; and the supernatant sludge and the bottom sludge taken individually or as a mixture.

The sludges may contain 20–80% of water in the form of relatively permanent emulsion. Bottom sludge may contain up to about 25% (by weight, based on oil content) of metallic iron, as well as shop dirt. The supernatant sludge may contain up to about 11% (based on oil content) of metallic iron. Typically, the scum consists of about equal parts, by volume, of oil and water ad iron contaminants, equal to about 3–8% of metallic iron.

The instant invention is preferably applied to fresh spent rolling oil sludge. The term "fresh" is used herein in the same manner as used by Louis Kovacs, U.S. Patent No. 2,806,868, granted Dec. 14, 1954, which patent is directed to the same problem of recovering fatty oil from spent rolling oil sludges. Succinctly but not definitively, a fresh sludge is one which is subjected to the instant invention within about 48 hours after the oil had been used in the strip rolling operation. (Chemical deterioration of the fatty oil increases the difficulty of separation of the sludge and lowers the yield and quality of recovered oil.)

Another patent of interest to this same problem is that of Benjamin W. Funk, U.S. Patent No. 3,243,446, granted Mar. 29, 1966.

In summary, the process of this invention comprises agitating at an elevated temperature a mineral acid and spent rolling oil sludge; the acid is used in an amount between about 5% of up to not more than the amount theoretically required to react with the iron content of said sludge and the agitation is continued for a time sufficient to permit the reaction to take place. At this point there has been obtained a liquid "sludge-acid mixture" which appears to the eye to be a single phase and is characterized by substantially no tendency to separate into different layers after a settling period. This liquid sludge-acid mixture is passed, at an elevated temperature, through a porous body of filter material. The liquid effluent (filtrate) from the filtration operation is readily physically separated into an oil portion and an aqueous portion which is substantially free of oil. At a proper filter rate, the effluent is a liquid system which separates physically into only two portions, i.e., an oil portion and an aqueous portion substantially free of oil.

In the process of the invention the sludge is treated with a mineral acid, for example, sulfuric acid, hydrochloric acid and phosphoric acid. The spent liquids from the pickling of steel with sulfuric acid or hydrochloric acid contain sufficient free acid to be useful in the process of this invention; therefore, spent sulfuric pickling acid and spent hydrochloric pickling acid and other pickling acids are included in the term "mineral acid."

It has been observed that the concentration of acid employed has an effect on the reaction time and also to some extent on the "filter rate" to obtain subsequent good physical separation. The high water content of the sludge effectively dilutes the acid; therefore, it is preferred to add concentrated acid to the sludge. In the case of sulfuric acid preferably 48° Baumé to 66° Baumé, i.e. approximately 60–93° $H_2SO_4$.

The amount of acid needed to obtain an improved "filter rate" with effective physical separation appears to be related to the iron content of the treated sludge. For convenience the acid usage is hereafter stated in terms of the amount theoretically needed to react with iron content of the sludge. A dramatic improvement is obtained with mineral acid in an amount as little as about 5% of the theoretical requirement. The "maximum" needed is somewhat related to the concentration of the acid added but in any case is not more than the theoretical requirement.

The sludge and acid are agitated at an elevated temperature for a time sufficient to permit reaction of the acid and the iron. Additional contacting time may be given but is unnecessary. The dilute spent pickling acids require disproportionately larger times as compared to the use of higher concentrated "fresh" acids. The time is related to the degree of agitation, the acid concentration, also the temperature of contacting and the size of the batch, in the case of batch treating. At temperatures near the boiling point of the sludge-acid mixture, times may range from a few seconds to on the order of one hour; usually with good agitation the reaction time is close to the addition time when in a batch operation, the acid is added gradually to the hot sludge. The working examples will more definitely show the time taken under various operating conditions.

The acid-sludge treating is carried out at an elevated temperature such that the apparent viscosity of the sludge is decreased. In general the temperature is above about 110° F. Preferably the lower temperature is about 160° F. Usualy the treating is carried out near or at the boiling point of the sludge-acid mixture, i.e., on the order of 215° F. at ordinary atmospheric pressure. More elevated temperature can be used in conjunction with pressure equipment.

At the preferred temperature range of about 160° F.–215° F., the preferred usage of acid, as a percentage of the theoretical requirement to react with metallic iron present in the sludge, is: concentrated sulfuric acid, between about 15% and 65%; spent sulfuric pickling acid, between about 50% and 75%; concentrated hydrochloric acid, between about 35% and 75%; and spent hydrochloric pickling acid, between about 70% and 100%.

In the process at the end of the treating, the sludge and the added acid are a unitary mixture which appears to the eye to be a one phase (emulsion) system. In fact the sludge-acid mixture has little or even no tendency to separate into layers on prolonged standing. It is preferred that the sludge-acid mixture be passed to the subsequent filtering operation shortly after it has been formed—reasonably short storage before filtering is not harmful.

The sludge-acid mixture is subjected to a filtering operation wherein the mixture is passed, at an elevated temperature, through a porous body of filter material. The "porous body of filter material" may also be understood as a body of particles affording a multiplicity of fine interstices. A preferred form of said body is a precoat of filtered positioned on a filter element, especially on a rotary vacuum filter.

The porous body may be made of any material which affords the type of interstices demonstrated by filter aids. The thickness of the porous body will be dependent on primarily the type of filter material and secondarily the life desired for a body of constant thickness. Successful results have been obtained on commercial scale rotary vacuum filters with diatomite and perlite filtered with a precoat thickness of ⅛ to ¼ inch.

The porous body may be a percolator for gravity flow or a batch or continuous filter bed for forced flow or a continuous filter of the precoat type. Here the precoat may be a one-shot affair where it is continuously renewed or it may be removed by the advancing knife until the precoat layer is cut to the minimum thickness. The porous body filter material will be in the form needed for the particular type of filtration.

A percolator may contain a bed of finely divided fuller's earth, sand, alumina, cellulose, glass or asbestos fibers or metal wool. Filters may utilize glass or carbon fiber mats; metal wool mats; cellulose mats; porous glass ceramic or metal plates; and the like. Precoat operations may use any of the filteraids, such as fuller's earth, diatomite, perlite, carbon, cellulose, and asbestos. The Encyclopedia of Chemical Process Equipment (1964), Reinhold Publishing Company, discussion of Filteraids, Filter Media, and Filtration Equipment, pp. 389–438 is illustrative of filter materials and equipment suitable for this process. (It is to be understood the filter material must be substantially inert to the acidic content of the sludge-acid mixture.)

The term "elevated temperature" in the filtration operation is intended to have the same meaning as stated earlier in the acid treating operation. In general the sludge-acid mixture will be passed almost immediately to the filter and therefore the filtration will take place at essentially the same temperature as the acid treating. It is preferred with a precoat filter to filter at between about 160° F. and 215° F.

Normally, a grade of filteraid is chosen which will at a given minimum thickness provide a liquid effluent which is easily physically separated into an oil portion and an aqueous portion substantially free of oil. The filter rate is closely related to the type of porous body but is mostly determined for the particular body by the degree of acid treating.

The liquid effluent from the filter appears to the eye to be an emulsion but this effluent very rapidly separates by gravity settling to a system consisting of an oil layer and an aqueous layer substantially free of oil. With a proper filteraid there is no middle layer of insoluble precipitates always present in the process of Louis Kovacs. The physical separation may be accomplished by simple gravity settling or by centrifuging and like operations. Preferably the physical separation is carried out at elevated temperature, usually at about the temperature of filtration.

After a conventional water washing and acid wash operation, the recovered oil may be reused as rolling oil. It has been observed that the fatty oil recovered by this process has a higher free fatty acid content than fresh oil but a lower free fatty acid content than oil recovered by the Louis Kovacs' process.

The process of the invention is illustrated by the following examples which are not to be considered as limiting. Where feasible comparative results are given for treating by the process of Louis Kovacs which is the present most common commercial operation.

ILLUSTRATION I

In these illustrations the rolling oil was substantially tallow. The freshly collected scum consisted of 55.0 weight percent of oil; 40.8% of water and 4.2% of iron. In order to completely digest all of the iron content, it is necessary to use 13.3% of sulfuric acid (100% basis), based on the oil content of the scum. (In all illustrations the acid requirement and usage is given as percent on a 100% basis, based on the oil content of the scum.) The fresh scum is a black semi-solid material at ordinary temperatures. It is too viscous to be filtered on the test filter.

A. Water only

To provide a base line for determining filter rates, fresh scum was boiled with water (about 212° F.); the water treated scum contained about 55% of water. The water treated scum was filtered in a standardized laboratory filter operation, as follows: The laboratory vacuum filter was simply a Buchner funnel (about 5" diameter circular filter area) with a filter cloth of polypropylene. The filter was precoated with the same amount of filteraid each time. The precoat was applied as a slurry in hot oil and left a cake of approximately ⅜" thickness. To measure filter rates the volume of filtrate collected in the first 15 seconds was recorded and converted to a rate in terms of ml. of dry oil per minute. The vacuum was about 25" of mercury in all trials. Tests showed that separation could be obtained to some degree by filtering at a temperature of 180° F. preferably higher. The resulting filtrate is still an emulsion as it comes from the filter, but it settles within 10 to 15 minutes into a clean oil and a murky water layer. The oil layer can be boiled with water without forming a permanent oil-water emulsion. (It is apparent that the iron powder left in the filter cake was the chief emulsifying agent.) Unfortunately, the filtration flow rates are slow and even worse the oil losses in the filter cake are prohibitively large.

B. Acid plus filter

Tests were made with acid amounts ranging from 0% (water only) to 21%. 66° Bé. sulfuric acid was used in all tests. The scum and acid were heated to boiling (about 212° F.) and boiled vigorously for 2 minutes. The scum-acid mixture was divided into two parts. One part was filtered immediately according to the procedure of IA, using Celite 545 (a diatomite) filteraid and the filter rate obtained. The other part was gravity settled and the degree of separation recorded periodically.

| Percent Sulfuric/oil present: | Filter rate (mls./min.) |
|---|---|
| 0 | 48 |
| 1 | 86 |
| 2 | 105 |
| 3 | 105 |
| 4 | 116 |
| 5 | 116 |
| 9 | 121 |
| 12 | 158 |
| 15 | 176 |
| 18 | 176 |
| 21 | 176 |

The range of 2–9% corresponds to about 15–65% of the theoretical requirement of sulfuric acid. The desirable operating range is 2–6% acid.

Oil losses in the filter cake were reasonably small.

In all tests with acid, the filter effluent emulsion rapidly separated on gravity settling in a clean oil layer and an aqueous layer which was substantially clear.

The oil is a light reddish-brown color. A subsequent water wash to remove traces of soluble silicates and a weak acid boil to remove any last traces of iron produce a sparkling clean, light yellowish brown oil which doesn't emulsify with water, even on boiling.

C. Acid plus settling only

The other part of the scum-acid mixture was gravity settled at 150° F.; periodically the degree of separation was recorded.

(1) After 2 hours, the 21%, 18% and 15% acid treated mixtures settled into 3 layers: a clean oil layer, a bottom clean aqueous acid layer and an intermediate tight emulsion layer (the insoluble precipitate of L. Kovacs and B. Funk.) There was no metallic iron present in these oils because excess acid had been used.

(2) After about two hours settling, the batches with 9 and 12% acid had settled into two layers: a dark dirty oil and a very heavy acid sludge layer. There was about 15% oil in the 9% acid layer and about 30% oil in the 12% acid layer. The oil contained many minute black particles. It appeared that a substantial amount of iron was concentrated in the heavy acid sludge layer. Settling for several days did not change the layers appreciably.

(3) The samples 1% through 5% acid did not settle virtually at all within eight hours. On settling for several days, a small amount of black oil separated on each sample. The amount of oil separated increased with the amount of acid.

D. Comments (1) The addition of a small amount of acid more than doubles the filtration rate over hot water saturated scum alone. The effect of a small quantity of acid is much more pronounced than would be expected by the amount of iron removed. If the improvement in filter rate were simply proportional to the amount of iron removed by acid, a curve would follow a straight line from zero percent acid up to the neutralization point. The whole range of acid addition from 1 to 5 percent is markedly above any such line. Above this range, the filter rate seems to be proportional to the amount of iron removed. After all the iron is removed, the filter rate is virtually constant.

(2) Except for the reasonably small losses to the filter cake, the new process virtually eliminates oil losses, in contrast to the large losses in the conventional process to the insoluble precipitate and to the aqueous layer.

(3) The new process eliminates the prolonged, up to 8 hours, boiling of the conventional process. The conventional process uses at least 25 to 30% acid. Considerable cost saving is possible.

(4) The exact quantity of acid to use depends upon many factors, but economics favors low acid addition and a large size filter.

ILLUSTRATION II.—FILTER MEDIA

Procedure.—Freshly collected scum (43.6% water, 5.4% iron and 51.0% oil). 5.1 gms. of 66° Bé. sulfuric acid were added to 200 gms. of scum (5% based on the oil). Each batch was heated to boiling and filtered on the lab. filter under 15" vacuum.

| Filter media | Filter rate, (ml./min.) | Quality of settled filtrate |
|---|---|---|
| Perlite #300 | 56 | Clean, no emulsion. |
| Perlite 200 | 97 | Do. |
| Perlite 100 | 107 | Do. |
| Solka floc (cellulose) | 41 | Do. |
| Asbestos fibers | 43 | Do. |
| Six filter papers Eaton-Dikeman #617. | 36 | Do. |

Further tests on other media.—3.9 gms. of 66° Bé. sulfuric acid were added to 150 gms. of scum. (5% based on oil).

| Filter media | Filter rate (ml./min.) | Quality of filtrate |
|---|---|---|
| Celite 545 (diatomaceous earth) | 80 | Clean, no emulsion. |
| Dicalite 4186 (perlite) | 102 | Do. |

Conclusion.—Any type of standard filter media would appear to be satisfactory.

ILLUSTRATION III–A.—(HYDROCHLORIC ACID)

A. HCl and filter

In this illustration the acid used was 38.0% hydrochloric. Freshly collected scum: 50.5% oil, 45.0% water, 4.5% iron. It requires 11.62% of 100% HCl based on the oil present to completely digest all the iron in the scum.

Tests were made with acid amounts ranging from 0 to 15.49% based on oil present. Each scum-oil batch was heated to boiling and boiled vigorously for 30 seconds. Each sample was divided in two. One half was immediately filtered on a lab vacuum filter as in I precoated with Dicalite 4186 filteraid. The rate of filtration was recorded. The other half was settled and the degree of separation recorded periodically.

| Percent HCl/oil present: | Filter rate (mls./min.) |
|---|---|
| 0.0 | 19 |
| 0.74 | 64 |
| 1.48 | 78 |
| 2.95 | 66 |
| 3.69 | 76 |
| 4.43 | 86 |
| 6.64 | 122 |
| 8.85 | 162 |
| 11.63 | 228 |
| 13.27 | 202 |
| 15.49 | 236 |

Here the maximum rate was at the theoretical acid usage. The preferred usage range is about 4.4–8.85% or about 35–75% of the theoretical requirement.

The filtrate behaved identically to the fresh sulfuric acid tests in I upon gravity settling. The recovered oil was worked up to reusable oil in the same manner as shown in I.

III–B.—HCl PLUS SETTLING ONLY

The other half of the scum-acid mixture obtained in III–A was settled at above 160° F. and the degree of separated recorded periodically.

(1) After about two hrs. settling, the batches with 13.27 and 15.49% acid settled substantially into clean oil, a small emulsion layer, and clean acid water. Traces of iron were present in the 13.27% batch.

(2) The batch with 11.63% settled into darker oil, a larger emulsion layer and clean acid water.

(3) After about two hrs. settling, the 6.64 and 8.85 batches settled into two layers: a dark dirty oil and a very heavy sludge layer. There was about 10% oil in the 6.64% batch and 25% in the 8.85% batch. The oil contained many minute black particles and the iron appeared concentrated in the sludge layer. Settling for 24 hrs. did not change the layers.

(4) The samples with less acid did not settle virtually at all within 8 hrs. On settling for several days, a small amount of black oil separated on each sample in proportion to the acid used.

IV.—SPENT HCl PICKLING ACID
A. Acid plus filter

In this illustration spent acid from hydrochloric acid pickling of steel was used to treat fresh scum. The spent HCl pickling acid contained 5% HCl and 20% ferric chloride. The scum was 49.4% oil; 46.0% water; and 4.6% metallic iron. This amount of iron requires 12.14% of HCl (100% basis) for reaction thereof.

Tests were made with acid amounts ranging from 0 to 19.1% on the oil present. Each scum-acid batch was heated to boiling, about 212° F., and boiled for 2 minutes. Each sample was divided in two. One half was immediately filtered on a lab vacuum filter as in I precoated with Celite 545 filteraid. The rate of filtration was recorded and converted to mls. of dry oil per minute. The other half sample was settled at 160° F. plus and the degree of separation recorded periodically.

| Percent HCl/oil present: | Filter rate (mls. oil/min.) |
|---|---|
| 0.0 | 15 |
| 1.49 | 28.7 |
| 2.235 | 31.1 |
| 2.98 | 34.7 |
| 3.73 | 35 |
| 4.47 | 38 |
| 6.71 | 38.3 |
| 8.94 | 52.8 |
| 11.8 | 105.7 |
| 13.4 | 113.2 |
| 15.65 | 151.7 |
| 19.1 | 162 |

The filtrate behaved identically to the fresh sulfuric and hydrochloric acid tests in I and III upon gravity settling. The recovered oil was worked up to reusable oil in the same manner as in I.

The spent HCl pickling acid is quite dilute and needs longer contacting time than conc. HCl or $H_2SO_4$. As a result a greater amount of acid than that theoretically required is needed to digest all the iron in a reasonable length of time. Here the desirable usage is between about 8.9% and 13.4% or between about 70% and 100% of the theoretical requirement.

IV–B.—ACID PLUS SETTLING ONLY

The various acid-scum mixtures were observed on gravity settling at 160° F. as follows:

(1) After two hrs., the 19.1% batch settled into clean oil, dark emulsion and green water. The 15.65, 13.4% batches were similar but contained more emulsion and the oil contained many fine black particles. Traces of iron were present in all samples.

(2) After two hrs., the 11.8, 8.94, and 6.71% batches settled into three layers as above, but the oil layers were only about 15, 10, and 7% respectively. The emulsion was very dense and the water layer was quite small. Settling for 24 hrs. did not change the layers.

(3) The samples with less acid did not settle virtually at all within 8 hrs. On settling for 24 hrs., a small amount of black oil separated in each sample in proportion to the acid used.

ILLUSTRATIONS V, VI AND VII

These three illustrations were carried out on a plant scale and the filtration was on a precoat rotary vacuum filter. V and VI were carried out using fresh 66° Bé. sulfuric acid and VII was carried out using spent sulfuric pickling acid. Comparative results are also presented.

ILLUSTRATION V
A. Acid plus filter 11,000 gallons of freshly collected scum containing 5.59% iron, 45% water and 49.5% oil were placed in an acid resistant cooking vessel. 140 gallons of 66° Bé. sulfuric acid were slowly added over a 20 minute period, with steam and air sparging; 4.9% based on oil. The fluidity of the mix increased markedly and the temperature of the mix rose to 205° F. A sample of the unitary scum-oil mixture at this point showed "nil" free acid and 2.95% free iron.

The mixture was filtered without delay on a 150 square foot Eimco rotary vacuum filter of the precoat type. The precoat consisted of Johns-Mansville Celite 545 diatomaceous earth which had been applied to the filter as a slurry in hot oil. The average rate of filtration was 1100 g.p.h. under a vacuum of 12–14″. Filteraid consumption was 6/10% based on the oil.

The effluent emulsion gravity settled rapidly into only two layers: (1) a supernatant clean oil layer of a light reddish brown color and (2) a pale green water layer. (No emulsion layer was present).

The oil layer was water washed and tested. The saponification number was 151 and the free fatty acid content was 20.7%. The oil was then given an acid wash with 10% sulfuric acid by boiling for 10 minutes. The oil broke cleanly and quickly from the water phase. After a final water wash the oil had lost its reddish color and the free fatty acid content was 20.9%. The oil yield was diminished only by oil left in the filter cake. However, this loss only amounted to about ½% of the oil produced.

B. Acid plus settling only

A sample of the mixture feed to the filter was gravity settled. Traces of water and a small layer of oil settled from the sample within 3 hrs. The oil was dark brown, almost black, in color and not clear. After 48 hrs. the quantity of oil had increased slightly; it was clear. However, it was still a brown-black color and was about 10% of the volume of the sample. The temperature of the sample was in excess of 150° F. while settling.

C. Conventional (L. Kovacs) treating

Fresh scum was treated by the *conventional process* in the lab. 66° Bé. acid usage was 34%, based on oil. The yield was only about 70% of the oil originally present. The balance of the oil was trapped in a relatively permanent emulsion. The resulting oil product had a darker color and a higher free fatty acid content (34.8%) than the oil from A above.

ILLUSTRATION VI
A. Acid plus filter 4000 gallons of freshly collected scum containing 5.1% iron, 49.7% water and 45.2% oil were placed in an acid resistant cooking vessel. 60 gallons of 66° Bé. sulfuric acid were slowly added over a 10 minute period with steam and air sparging; 5.8% based on oil. The fluidity of the mix increased markedly and the temperature of the mix was raised to 212° F. by continued heating. A sample of the mixture at this point showed "nil" free mineral acid and 2.3% free iron.

The unitary scum-acid mixture was then filtered at this elevated temperature on a 150 square foot Eimco rotary vacuum filter of the precoat type. The precoat consisted of Great Lakes Carbon Dicalite 4156 perlite which had been applied to the filter as a slurry in hot oil. The average rate of filtration was 1200 g.p.h. under a vacuum of 15–17″. Filteraid consumption was 8/10% based on the oil.

The filtrate gravity settled rapidly into two layers: (1) a supernatant clean oil layer of a light reddish brown color and (2) a pale green water layer. (No emulsion layer was present.)

The oil layer was separated into two portions. The first portion was water washed, tested, acid washed, water washed again and retested. After the first water wash, the free fatty acid content was 22.1%. The final product was 22.5% free fatty acid, light brown in color and broke cleanly from water with no emulsion formation.

The second portion was acid washed without a prior water wash. A small quantity of relatively permanent emulsion formed which did not settle on 24 hrs. settling. It is believed that the first water wash is needed to remove silicates from the filtrate. The balance of the oil was identical to the oil product of the first portion.

B. Acid plus settling only

A sample of the mixture fed to the filter was gravity settled. A small amount of supernatant oil settled within 2 hrs. The oil was dark in color and dirty in appearance. After 48 hrs. settling, the oil layer was about 15% of the volume of the sample. The oil was clear, but quite dark in color. The balance of the sample was similar to the original scum. The temperature of the sample was in excess of 150° F. while settling.

C. Conventional (L. Kovacs) treating

Fresh scum was treated by the conventionl process in the lab. The acid usage was 29%. The yield was only about 75% of the oil originally present. The balance of the oil was trapped in a relatively permanent emulsion. The product oil was dark in color, had a free fatty acid content of 39.1% and a saponification number of 163.1.

ILLUSTRATION VII

A. Pickling acid plus filter 5000 gallons of freshly collected scum containing 4.6% iron, 44.4% water and 51% oil were heated to 160° F. with air and steam sparging in an acid resistant cooking vessel. 800 gallons of waste acid from the pickling of steel sheets (approximately 8% free sulfuric acid and 13% ferrous sulfate) was added slowly over a 15 minute period; 6% acid based on oil. Steam sparging was continued until the batch boiled. The temperature was approximately 212° F. The mix foamed up when the waste acid was being introduced, but subsided soon after addition stopped. The fluidity of the mix increased markedly. A sample of the mixture at this point showed 2.25% free iron and "nil" free acid.

The unitary scum-acid mixture was then filtered at about this temperature on a 150 square foot Eimco rotary vacuum filter of the precoat type. The precoat consisted of Johns-Manville Celite 545 diatomaceous earth which had been applied to the filter as a slurry in hot oil. The average rate of filtration was 1350 g.p.h. under a vacuum of 12–14″. Filteraid consumption was approximately 1% based on the oil.

The filtrate gravity settled rapidly into two layers: (1) a supernatant clean oil layer of light reddish brown color and (2) a pale green water layer. (No emulsion layer was present.)

The oil layer was water washed and tested. The saponification number was 158.3 and the free fatty acid content was 19.8%. The oil was then given an acid wash with 5% sulfuric acid by boiling for 20 minutes. The oil broke cleanly and quickly from the water phase. The oil had lost its reddish color and after a final water wash the free fatty acid content was 21%. The oil yield was diminished only by the oil left in the filter cake; this loss was only about 1% of the oil produced.

B. Pickling acid plus settling only

A sample of the mixture feed to the filter was gravity settled. It settled in about 3 hrs. into three layers: (1) dark, dirty, oil—about 10%; (2) scum—about 80%; and (3) green colored water about 10%. Prolonged settling of two days at temperatures in excess of 150° F. did not change these quantities, but made the small oil layer clear.

C. Conventional (B. Funk) treating

Fresh scum was treated by the conventional process in the lab. Acid usage was 37%. The yield was about 90% of the oil originally present. The balance of the oil was trapped in a relatively permanent emulsion. The resulting product had a darker color, a higher free fatty acid content (30.5%) than A above.

A general observation about the oil recovered by the above various embodiments of the process of this invention is that the oil was of high quality regardless of the type of acid used in treating the scum and also the amount of acid used had little effect on that quality.

Also these embodiments show that the process of the invention greatly reduces the amount of acid needed to treat the sludge and simultaneously gives a higher yield of recovered oil than is possible with the processes now available to this art.

Thus having described the invention, what is claimed is:

1. A process for treating spent fatty rolling oil sludge to recover oil therein, which sludge consists essentially of a relatively permanent emulsion of oil, water and iron contaminants, which process comprises:
    (1) treating, with agitation, said sludge with a mineral acid, said acid being present in an amount of between about 5% and about 75% of the amount theoretically required to react with said iron content, at an elevated temperature of between about 110° and about 215° F., to obtain a unitary sludge-acid mixture characterized by no tendency on gravity settling to separate into an oil layer and an aqueous layer substantially free of oil;
    (2) passing said sludge-acid mixture, at an elevated temperature of between about 110° and about 215° F., through a porous body of filter material, which material is substantially inert to said acid, to obtain an emulsion effluent; and
    (3) physically separating said emulsion effluent into a system consisting of an oil portion and an aqueous portion substantially free of oil.

2. The process of claim 1 wherein said mineral acid is selected from the group consisting of sulfuric acid, spent sulfuric pickling acid, hydrochloric acid, and spent hydrochloric pickling acid.

3. The process of claim 2 wherein in each of said steps (1) and (2) said temperature is between about 160° F. and about 215° F.

4. The process of claim 1 wherein said porous body filter material is selected from the class consisting of fuller's earth, diatomite, perlite, carbon, cellulose, and asbestos.

5. The process of claim 1 wherein said physical separation is obtained by gravity settling of said emulsion effluent into only an oil layer and an aqueous layer substantially free of oil.

6. A process for treating spent fatty rolling oil sludge to recover oil therein, which sludge consists essentially of a relatively permanent emulsion of oil, water and iron contaminants, which process comprises:
   (a) treating, with agitation, said sludge with concentrated sulfuric acid, said acid being present in an amount between about 15% and about 65% of the theoretical requirement to react with said iron, at an elevated temperature of between about 160° F. and about 215° F., to obtain a unitary sludge-acid mixture characterized by no tendency on gravity settling to separate into an oil layer and an aqueous layer substantially free of oil;
   (2) filtering said mixture through a precoat thickness of filter aid, which aid is substantially inert to said acid, at a temperature of bewteen about 160° F. and about 215° F., to obtain an emulsion effiuent; and
   (3) physically separating said emulsion effluent into a system consisting of an oil portion and an aqueous portion substantially free of oil.

7. The process of claim 6 wherein said acid is between about 48° Bé. and about 66° Bé. (60–93%).

References Cited
UNITED STATES PATENTS

| | | | |
|---|---|---|---|
| 1,790,748 | 2/1931 | Holden et al. | 260—412.5 |
| 2,587,954 | 3/1952 | Babayan | 260—412.5 |
| 2,806,868 | 9/1957 | Kovacs | 260—412.5 |
| 3,243,446 | 3/1966 | Funk | 260—412.5 |

FOREIGN PATENTS

| | | |
|---|---|---|
| 764,685 | 1/1957 | Great Britain. |

LEON ZITVER, Primary Examiner

HOWART T. MARS, Assistant Examiner

U.S. Cl. X.R.

208—183